(12) United States Patent
Kim et al.

(10) Patent No.: US 10,996,850 B2
(45) Date of Patent: May 4, 2021

(54) METHOD AND APPARATUS FOR CONTROLLING VIRTUAL KEYBOARD

(71) Applicant: LG ELECTRONICS INC., Seoul (KR)

(72) Inventors: Sung Jin Kim, Gyeonggi-do (KR); Jeong Heo, Seoul (KR); Beom Oh Kim, Gyeonggi-do (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/563,579

(22) Filed: Sep. 6, 2019

(65) Prior Publication Data
US 2020/0004418 A1    Jan. 2, 2020

(30) Foreign Application Priority Data

May 29, 2019   (KR) ........................ 10-2019-0063332

(51) Int. Cl.
| | | |
|---|---|---|
| *G06F 3/0488* | (2013.01) | |
| *G06N 20/20* | (2019.01) | |
| *G06F 1/16* | (2006.01) | |
| *G06F 3/01* | (2006.01) | |
| *G06F 3/02* | (2006.01) | |

(52) U.S. Cl.
CPC ........ *G06F 3/04886* (2013.01); *G06F 1/1624* (2013.01); *G06F 3/011* (2013.01); *G06F 3/0216* (2013.01); *G06N 20/20* (2019.01)

(58) Field of Classification Search
CPC .... G06F 3/04886; G06F 1/1624; G06F 3/011; G06F 3/0216; G06F 3/04186; G06F 3/0236; G06F 3/0233; G06N 20/20; G06N 3/0445; G06N 3/0481; G06N 5/003; G06N 7/005; G06N 20/10; G06N 3/0454; G06N 20/00; G06N 3/08

See application file for complete search history.

(56) References Cited

U.S. PATENT DOCUMENTS

| | | | |
|---|---|---|---|
| 2013/0222247 A1* | 8/2013 | Liu ...................... | G06F 3/04886 345/168 |
| 2017/0235482 A1* | 8/2017 | Ferren .................... | G06F 21/40 715/773 |

FOREIGN PATENT DOCUMENTS

| | | |
|---|---|---|
| JP | 2016527643 | 9/2016 |
| KR | 1020120007042 | 1/2012 |

(Continued)

OTHER PUBLICATIONS

Korean Intellectual Property Office Application No. 10-2019-0063332, Office Action dated Jun. 30, 2020, 6 pages.

(Continued)

*Primary Examiner* — Mark W Regn
(74) *Attorney, Agent, or Firm* — Lee, Hong, Degerman, Kang & Waimey

(57) ABSTRACT

A virtual keyboard control apparatus and control method are disclosed. The virtual keyboard control method includes collecting typo data including a desired input key and an erroneously input key, analyzing the typo data, and updating the key mapping of at least one virtual key of the desired input key and the erroneously input key by using the analyzed result. According to the present disclosure, it is possible to implement the optimum key mapping in which a typo is less generated for each user through Reinforcement Learning of Deep Learning by using the reward called a reduction in a typo rate.

16 Claims, 6 Drawing Sheets

(56) References Cited

FOREIGN PATENT DOCUMENTS

| KR | 1020140089812 | 7/2014 |
| KR | 1020140145908 | 12/2014 |
| KR | 1020170070426 | 6/2017 |
| KR | 1020180105643 | 9/2018 |

OTHER PUBLICATIONS

Korean Intellectual Property Office Application Serial Number No. 10-2019-0063332, Notice of Allowance dated Jan. 15, 2021, 5 pages.

* cited by examiner

[FIG. 1]
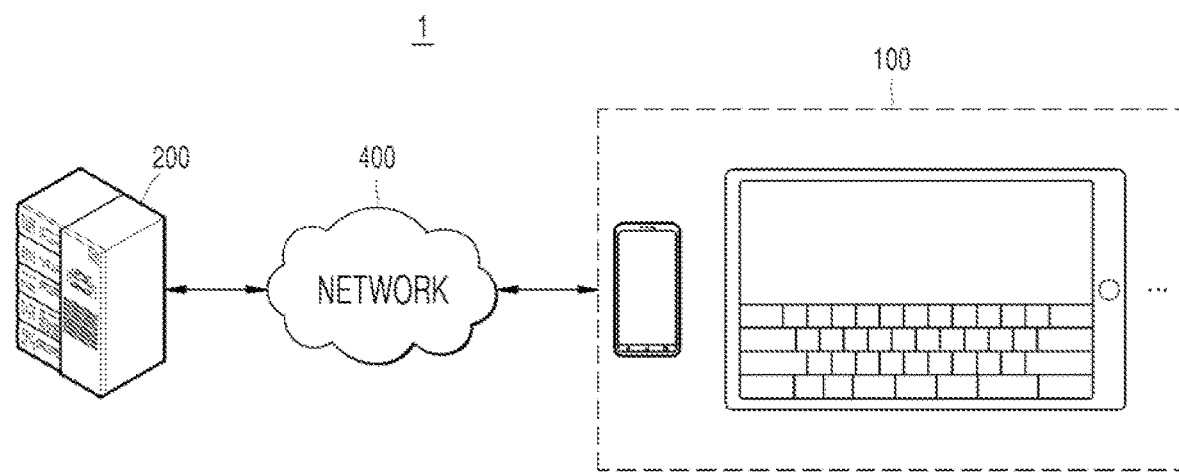

[FIG. 2]
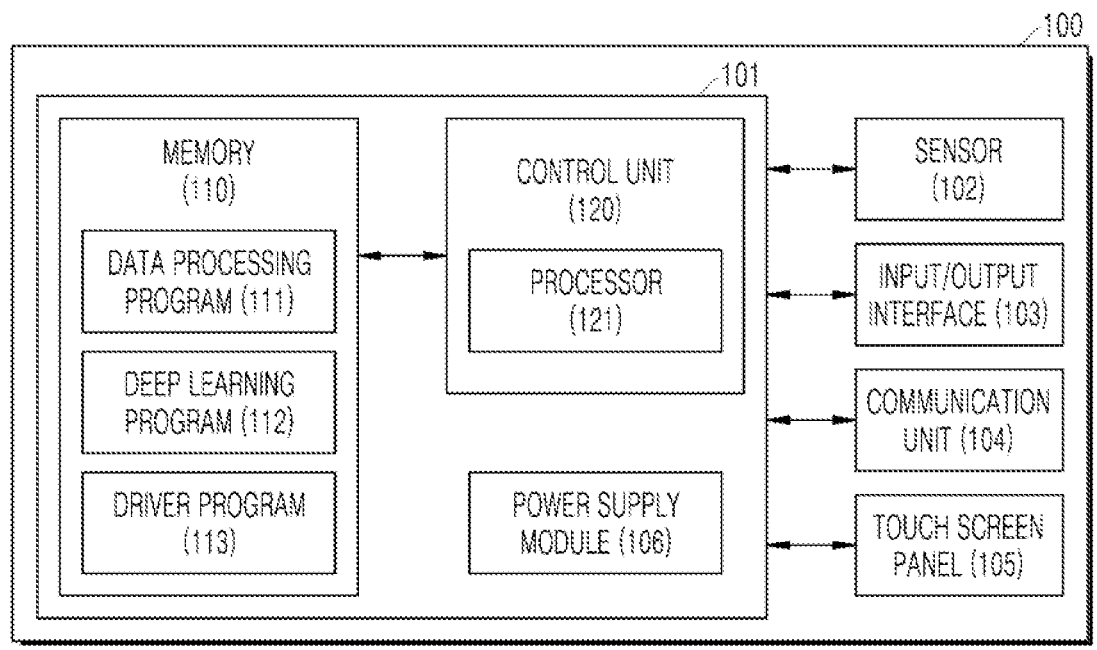

[FIG. 3]
| | NORMAL COORDINATE | TYPO COORDINATE |
|---|---|---|
| ㄱ | (atx1, aty1), (atx2, aty2) ···, ··· | (afx1, afy1), (afx2, afy2) ···, ··· |
| ㄴ | (btx1, bty1), (btx2, bty2) ···, ··· | (bfx1, bfy1), (bfx2, bfy2) ···, ··· |
| ··· (OMITTED) | ··· (OMITTED) | ··· (OMITTED) |
| ― | (ytx1, yty1), (ytx2, yty2) ···, ··· | (yfx1, yfy1), (yfx2, afy2) ···, ··· |
| │ | (ztx1, zty1), (ztx2, zty2) ···, ··· | (zfx1, zfy1), (zfx2, zfy2) ···, ··· |
[FIG. 4]
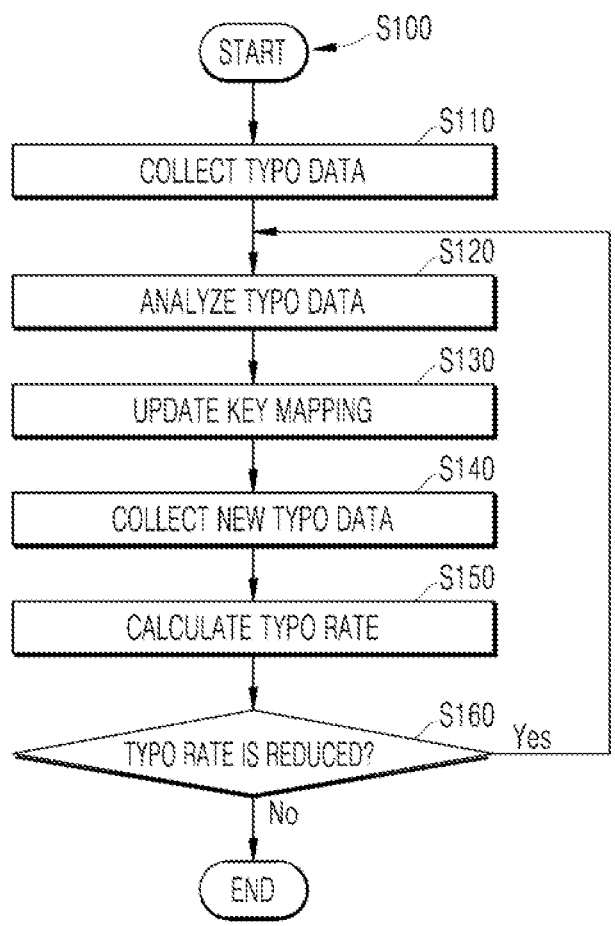

[FIG. 5]
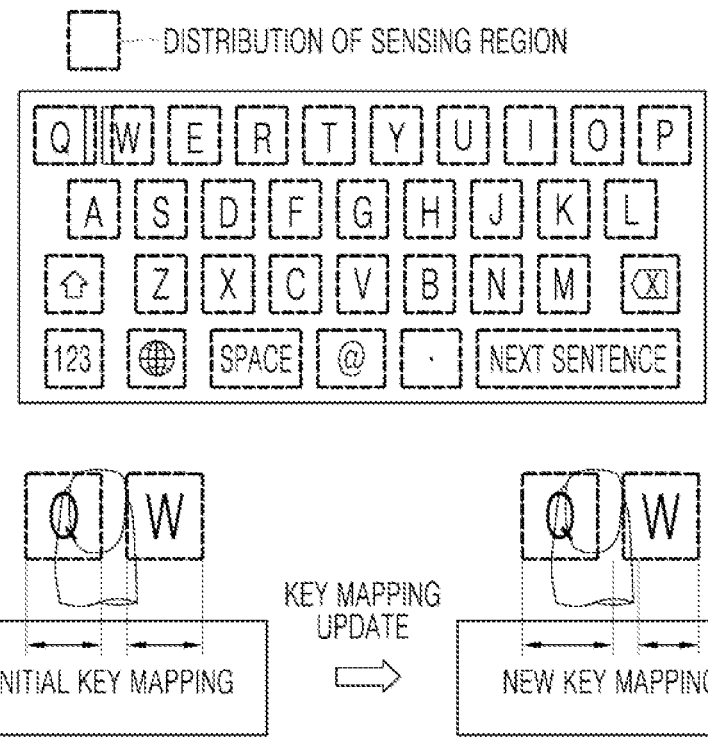
[FIG. 6]
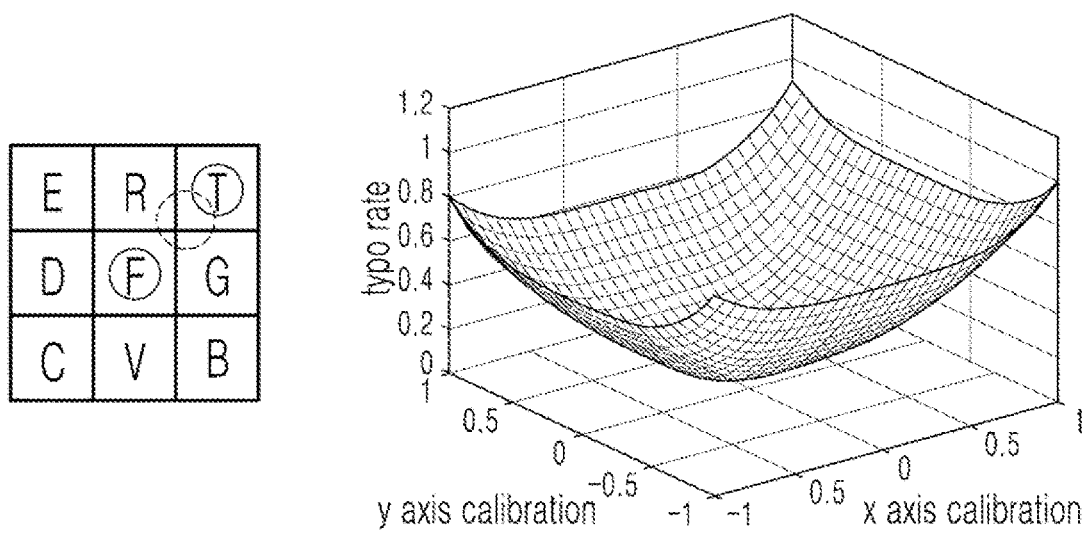

[FIG. 7]
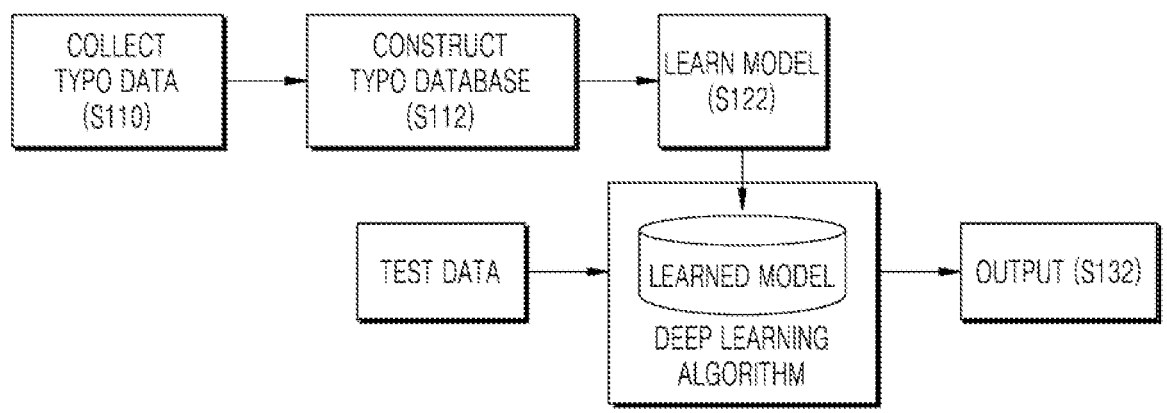

[FIG. 8]
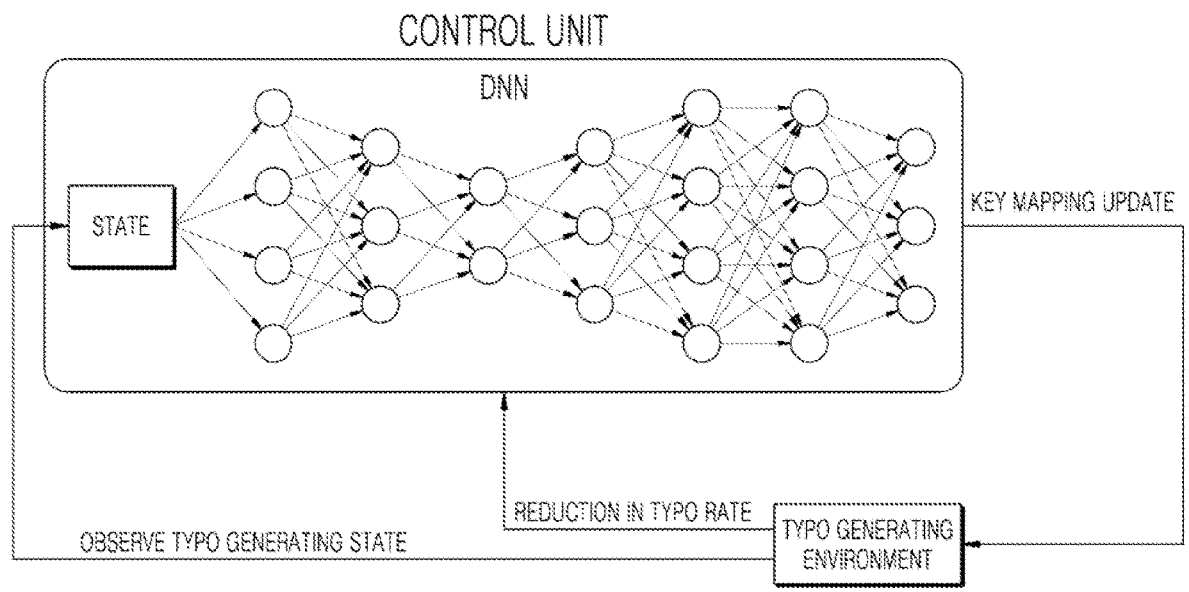

METHOD AND APPARATUS FOR CONTROLLING VIRTUAL KEYBOARD

CROSS-REFERENCE TO RELATED APPLICATION

Pursuant to 35 U.S.C. § 119(a), this application claims the benefit of earlier filing date and right of priority to Korean Patent Application No. 10-2019-0063332, filed on May 29, 2019, the contents of which are hereby incorporated by reference herein in its entirety.

BACKGROUND OF THE DISCLOSURE

1. Field of the Invention

The present disclosure relates to a virtual keyboard control method and control apparatus, and more particularly, to a virtual keyboard control method for reducing or preventing occurrence of a typo in a virtual keyboard and a virtual keyboard control apparatus using the same.

2. Description of Related Art

At the present time of a computer development process, a keyboard and a mouse are the most universal computer input devices. Input devices such as a touch pad and a touch screen corresponding to the keyboard and the mouse are mainly used even in portable devices such as a laptop computer, a tablet computer, and a smart phone.

A software keyboard is widely used as the input device for a mobile device, but on the other hand, a hardware keyboard is forming a small number of mania classes. The hardware keyboard has the advantages in that the accurate input is possible and there is the sense of input called a taste of hand. On the other hand, the software keyboard, particularly, the touch screen, has the advantages in that it can be used as an input device when necessary, and in addition, as a display device, thereby having high space usability.

Despite the advantages of the hardware keyboard, the software keyboard is widely used in the mobile device due to the space usability. However, a high typo rate that is the disadvantage of the software keyboard is pointed out as a problem.

A key spacing adjustment method for preventing a typo is disclosed in the related art 1. According to the related art 1, although the typo is prevented by adjusting the spacing between the desired input key and the typo-caused key, the input habit of the user is changed, an adaptation time for the adjusted spacing is required, and in this process, there is a high possibility that a secondary typo will be caused.

A keyboard for preventing the typo in the portable electronic device is disclosed by the related art 2. According to the related art 2, as the conventional single-line QWERTY keyboard arrangement is divided into two lines, the area of the keyboard increases, the versatility reduces, the adaptation time for the change in arrangement is required, and in this process, there is the high possibility that the secondary typo will be caused.

RELATED ART DOCUMENTS

Patent Documents (Patent Document 1) Korean Patent Laid-Open Publication No. 10-2017-0070426 (published on Jun. 22, 2017)
(Patent Document 2) Korean Patent Laid-Open Publication No. 10-2014-0145908 (published on Dec. 24, 2014)

SUMMARY OF THE INVENTION

An object of the present disclosure is to solve the problem of the related art in which a secondary typo is generated due to a change in shape and arrangement of virtual keys.

Another object of the present disclosure is to solve the problem of the related art in which the user adaptation was required according to the change in shape and arrangement of the virtual keys.

Still another object of the present disclosure is to solve the problem of the related art in which the changed shape and arrangement of the virtual keys should not be applied differently for each user.

The objects of the present disclosure are not limited to the objects described above, and other objects and advantages not described in the present disclosure can be understood by the following description and will be understood more reliably by an embodiment of the present disclosure. In addition, it will be understood that the objects and the advantages of the present disclosure can be realized by the means recited in claims and a combination thereof.

A virtual keyboard control method according to an embodiment of the present disclosure for achieving the objects is performed by a virtual keyboard control apparatus. The virtual keyboard control apparatus can include a processor, and the processor can substantially perform the virtual keyboard control method.

Herein, since the user equipment can be configured to include the virtual keyboard control apparatus, the user equipment can also perform the virtual keyboard control method.

A virtual keyboard can be configured to include a hardware component and a software component. The hardware component can include a main body such as a Touch Screen Panel (TSP) or a beam projector and a control unit for controlling it. In addition, the control unit can be configured to include a processor. The software component can include a control program that controls the virtual keyboard. Instruction logics constituting the control program can be executed by the processor in a state stored in a memory.

A software keyboard has the same meaning as the virtual keyboard when used as the opposite concept of a hardware QWERTY keyboard. In some cases, the software keyboard can be used as a synonym for the software component of the virtual keyboard.

A virtual keyboard control method according to an embodiment of the present disclosure can be configured to include collecting typo data including a desired input key and an erroneously input key, analyzing the typo data, and updating the key mapping of at least one virtual key of the desired input key and the erroneously input key by using the analyzed result.

Herein, the key mapping is to map the sensing region where the human body contact or the human body sensing occurs on the virtual keyboard to the key value to be output, and determines which range of coordinate space in which the human body contact or the human body sensing occurs is perceived as the input of the corresponding key.

In addition, the analyzing the typo data can be configured to include calculating a typo rate. In addition, the analyzing the typo data can be configured to further include analyzing the relationship between a point where the human body contact or the human body sensing has occurred actually within the sensing region of the erroneously pressed key and the sensing region of a desired key, when the typo has been generated.

In addition, the virtual keyboard control method can further include collecting new typo data according to new key mapping. Herein, the analyzing the typo data and the updating the key mapping can be repeated with respect to the new typo data.

As an embodiment, the analyzing the typo data and the updating the key mapping according to the analyzed result can be implemented through an Artificial Intelligence, particularly, the Reinforcement Learning process of Deep Learning. In this case, the agent corresponds to the virtual keyboard control apparatus or the virtual keyboard including the same, and the virtual keyboard can find a state where the typo rate gradually reduces to converge to zero while receiving the reward through a gradual reduction in typo rate, through the Reinforcement Learning process.

In addition, the virtual keyboard control method can further include determining whether the typo rate has been reduced after the key mapping update. Herein, when the typo rate has been reduced, it can feedback information on the key mapping update to any one of the subsequent steps, including the analyzing the typo data.

In addition, the typo can be generated by a human body contact on the virtual keyboard or the interference between the virtual keys due to the human body behavior on the virtual keyboard.

In addition, the typo data can be configured to include two-dimensional coordinate values corresponding to the desired input key and the erroneously input key. Herein, the typo data can be configured to include three-dimensional coordinate values corresponding to the key when the virtual keyboard is generated in the three-dimensional space.

In addition, the analyzing the typo data can be configured to include learning an Artificial Intelligence model by using an Artificial Intelligence algorithm.

In addition, the updating the key mapping can be configured to include updating the key mapping by using an Artificial Intelligence model learned based on an Artificial Intelligence algorithm. Herein, the Artificial Intelligence (AI) model can include Supervised Learning or Reinforcement Learning model among the Deep Learning models. In the Supervised Learning model, the relationship between the actually sensed point in the sensing region of the erroneously pressed key and the sensing region of the desired key and the specific key mapping update information in the corresponding relationship can be used as learning data labeled.

In addition, the virtual keyboard control apparatus corresponding to the agent or the virtual keyboard including the same can continuously perform Reinforcement Learning in order to reach a state where the gradual reduction in the typo rate acts as the reward and the typo rate converges to zero in the Reinforcement Learning model.

In addition, the updating the key mapping can be configured to include updating at least one of the position, shape, and area of a sensing region allocated to the virtual key with respect to the virtual key having a threshold typo rate.

Herein, the position update of the sensing region includes adjusting the relative position of the sensing region of the erroneously input key and the sensing region of the desired key. Then, the shape update includes changing into a polygonal shape having edges or an elliptical or circular shape removing edges. Then, the area update includes reducing or widening the previous area of the sensing region.

In addition, the position, shape, and area of the virtual key itself cannot be changed. Since the virtual key itself is not changed, the user cannot directly feel the key mapping, and can feel a change due to a reduction in the typo rate as the typing result.

A virtual keyboard control apparatus according to an embodiment of the present disclosure can be configured to include an input interface for receiving typo data including information on a desired input key and an erroneously input key from a virtual keyboard, a memory for storing key mapping information including a sensing region of the virtual keyboard and a key value corresponding thereto, and a control unit for outputting the key value corresponding to the corresponding key by using the key mapping information according to the sensing of a human body. Herein, the control unit can be configured to include a processor for analyzing the typo data, and updating the key mapping information according to the analyzed result.

In addition, the processor can calculate a typo rate by using the typo data.

In addition, the processor can analyze the typo data until a reduction in the typo rate converges to zero, and update the key mapping information according to the analyzed result, with respect to the typo data according to new key mapping information.

In addition, the processor can determine whether the typo rate has been reduced after the key mapping update, and when the typo rate has been reduced, can use the information on the key mapping update as a feedback information in analyzing the typo data, and updating the key mapping information according to the analyzed result.

In addition, the typo can be generated by a human body contact on the virtual keyboard or the interference between the virtual keys due to the human body behavior on the virtual keyboard.

In addition, the typo data can be configured to include two-dimensional coordinate values corresponding to the desired input key and the erroneously input key.

In addition, the processor can analyze data through an Artificial Intelligence model learning using an Artificial Intelligence algorithm.

In addition, the processor can update the key mapping by using the Artificial Intelligence model learned based on an Artificial Intelligence algorithm.

In addition, the processor can update at least one of the position, shape, and area of a sensing region allocated to the virtual key with respect to the virtual key having a threshold typo rate.

In addition, the processor cannot change the position, shape, and area of the virtual key itself.

According to the present disclosure, it is possible to implement the optimum key mapping in which the typo is less generated for each user through the Reinforcement Learning of Deep Learning by providing the reward for the typo rate reduction.

In addition, it is possible to prevent the typo through the key mapping update even without changing the shape and arrangement of the keyboard.

In addition, it is possible to prevent the secondary typo from being generated according to the change in the shape and arrangement of the keyboard, thereby reducing the trial and error of the related art.

In addition, it is possible to implement a low typo rate in a state where the user unknowingly keeps his/her typing habit because there is no change in the shape and arrangement of the keyboard.

BRIEF DESCRIPTION OF THE DRAWINGS

The foregoing and other aspects, features, and advantages of the disclosure, as well as the following detailed description of the embodiments, will be better understood when read in conjunction with the accompanying drawings. For the purpose of illustrating the present disclosure, there is shown in the drawings an exemplary embodiment, it being understood, however, that the present disclosure is not intended to be limited to the details shown because various modifications and structural changes can be made therein without departing from the spirit of the present disclosure and within the scope and range of equivalents of the claims. The use of the same reference numerals or symbols in different drawings indicates similar or identical items.

FIG. 1 is an exemplary diagram of a network environment including a user equipment in which a virtual keyboard control apparatus according to an embodiment of the present disclosure is included and a server.

FIG. 2 is a block diagram of the user equipment including the virtual keyboard control apparatus according to an embodiment of the present disclosure.

FIG. 3 is an exemplary diagram of typo data according to an embodiment of the present disclosure.

FIG. 4 is a flowchart of a virtual keyboard control method according to an embodiment of the present disclosure.

FIG. 5 is an exemplary diagram relating to a key mapping update according to an embodiment of the present disclosure.

FIG. 6 is a typo distribution diagram showing a typo rate according to an embodiment of the present disclosure.

FIG. 7 is an exemplary diagram of a Deep Learning process according to an embodiment of the present disclosure.

FIG. 8 is an exemplary diagram of Reinforcement Learning according to an embodiment of the present disclosure.

DETAILED DESCRIPTION

Hereinafter, the embodiments disclosed in the present specification will be described in detail with reference to the accompanying drawings, the same or similar elements regardless of a reference numeral is denoted by the same reference numeral and a duplicate description thereof will be omitted. The suffixes "module" and "unit" for the element used in the following description are given or mixed considering only ease of writing specification, and do not have their own meaning or role. In addition, in relation to describing the present disclosure, when the detailed description of the relevant known technology is determined to unnecessarily obscure the gist of the present disclosure, the detailed description can be omitted. In addition, it should be understood that the accompanying drawings are merely for easily understanding the embodiments disclosed in the present disclosure, the technical spirit disclosed in the present specification is not limited by the accompanying drawings, and they include all changes, equivalents or alternatives included in the spirit and the technical scope of the present disclosure.

Although the terms including ordinal such as first, second, etc. can be used to describe various elements, these elements should not be limited by these terms. These terms can be only used to distinguish one element from another element.

It should be understood that when an element is referred to as being "connected to," or "coupled to" another element, it can be directly connected or coupled to the other element, but intervening elements can also be present. In contrast, it should be understood that when an element is referred to as being "directly connected to," or "directly coupled to" another element, there can be no intervening elements present.

FIG. 1 is an exemplary diagram of a network environment including a user equipment in which a virtual keyboard control apparatus according to an embodiment of the present disclosure is included and a server.

Referring to FIG. 1, a virtual keyboard control system 1 according to an embodiment of the present disclosure can be configured to include a user equipment 100, a server 200, and a network 400.

FIG. 2 is a block diagram of a user equipment including a virtual keyboard control apparatus according to an embodiment of the present disclosure.

Referring to FIG. 2, the user equipment 100 can be configured to include a virtual keyboard control apparatus 101, a sensor 102, an input/output interface 103, a communication unit 104, a touch screen panel 105, and a power supply module 106.

The user equipment 100 can include an input means, and correspond to a communication device capable of wired and wireless communication, which can perform a computing function. Preferably, the user equipment 100 includes a touch screen panel 105 corresponding to the hardware of a virtual keyboard, and in addition, is a wireless terminal that can further include a device corresponding to the virtual keyboard, for example, a beam projector, among the input/output interfaces 103.

Various embodiments of the wireless terminal can include not only a cellular telephone, a smart phone with a wireless communication function, a personal digital assistant (PDA) with a wireless communication function, a wireless modem, a portable computer with a wireless communication function, a photographing device such as a digital camera with a wireless communication function, a gaming device with a wireless communication function, a music storage and playback appliance with a wireless communication function, and an internet appliance in which wireless internet access and browsing are possible, but also portable units or terminals integrating combinations of these functions, but are not limited thereto.

The user equipment 100 can perform an Artificial Intelligence (AI) assistant function. The Artificial Intelligence assistant recognizes the user's voice, outputs the response suitable for the recognized user's voice as a voice, or operates the user equipment according to the recognized user's voice.

The server 200 can collect and store the typo data collected through the user equipment 100. In addition, the server 200 can perform data mining by using the typo data. In addition, the server 200 can learn an Artificial Intelligence model by using an Artificial Intelligence algorithm based on the processed typo data. Otherwise, the server 200 can evaluate the Artificial Intelligence model and update the Artificial Intelligence model by using new typo data. Herein, the user equipment 100 can perform a series of stages performed by the server 200 alone or together with the server 200.

The network 400 can be any suitable communication network including a wired and wireless network, for example, a local area network (LAN), a wide area network (WAN), an internet, an intranet, an extranet, and a mobile network, for example, cellular, 3G, LTE, 5G, WiFi networks, an ad hoc network, and a combination thereof.

The network 400 can include the connection of network elements such as a hub, a bridge, a router, a switch, and a gateway. The network 400 can include one or more connected networks, for example, a multi-network environment, including a public network such as an internet and a private network such as a safe corporate private network. The access to the network 400 can be provided via one or more wired or wireless access networks.

Referring again to FIG. 2, the virtual keyboard control apparatus 101 can be configured to include a memory 110 and a control unit 120. Then, the control unit 120 can be configured to include a processor 121.

The memory 110 can be configured to include a volatile memory and a nonvolatile memory. Then, the nonvolatile memory can be used as a storage device. At least one software can be stored in the memory 110. The software can include an operating system, a system program, and various application programs. The memory 110 can be configured to store a data processing program 111, a Deep Learning program 112, and a driver program 113.

The data processing program 111 serves to detect the generation of a typo, generate typo data by using the detected typo record, and furthermore, generate a database by using the typo data, and analyze it. An input key value is stored in a key log file that has recorded the key input of the virtual keyboard including the keyboard. The generation of the typo can be detected by inspecting the history of the modified key input by using a backspace key or a DEL key.

The processor 121 distinguishes the desired key from the erroneously pressed key by using the record of the typo, and assigns a coordinate value to each key to generate typo data. The typo data includes a two-dimensional coordinate value of the corresponding key, and when the virtual keyboard is implemented in three dimensions, the corresponding key can be expressed by a three-dimensional coordinate value.

FIG. 3 is an exemplary diagram of the typo data according to an embodiment of the present disclosure.

Referring to FIG. 3, a configuration of the typo data is shown. The typo data can be configured to include normal typing data and typo data. A normal typing coordinate value and a typo coordinate value are stored in the form of typo data for each key of the keyboard. The typo coordinate value can include the coordinate value of the erroneously input key instead of the desired input key.

The typo data can be configured to include information about a sensing region in which a human body contact is detected when the key has been erroneously input, together with the coordinate values of the desired input key and the erroneously input key. The sensing region can likewise be expressed by a coordinate value. The processor 111 can obtain the solution for reducing the typo rate based on the coordinate of the typo-occurred sensing region by analyzing the typo data.

The processor 121 learns the Artificial Intelligence model by using the Artificial Intelligence algorithm through the Deep Learning program 112. Then, the processor 111 updates the key mapping by using the Artificial Intelligence model learned based on the Artificial Intelligence algorithm. The virtual keyboard can be controlled so that the optimum state where the typo rate can become the minimum by the Artificial Intelligence model is implemented. The Deep Learning program 112 can be configured to include, for example, an Artificial Intelligence workflow and an Artificial Intelligence API.

The driver program 113 serves to control the hardware configuration of the virtual keyboard such as the touch screen panel 105, for example.

The control unit 120 can be configured to include the processor 121. The processor 121 controls the sensor 102, the input/output interface 103, the communication unit 104, the touch screen panel 105, and the power supply module 106, and in addition, controls the virtual keyboard by using the data processing program 111, the Deep Learning program 112, and the driver program 113 stored in the memory 110. The control of the virtual keyboard can include controlling an operation of the touch screen panel 105.

The sensor 112 can be configured to include at least one of a proximity sensor, an illumination sensor, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (e.g., a camera), a microphone, a battery gauge, an environmental sensor (e.g., a barometer, a hygrometer, a thermometer, a radiation sensing sensor, a heat sensing sensor, a gas sensing sensor, etc.), and a chemical sensor (e.g., an electronic nose, a healthcare sensor, a biometric sensor, etc.).

The input/output interface 103 receives an input from an external device, or corresponds to an interface for outputting to the external device. The input interface 103 receives the typo data through the touch screen panel 105 of the server 200 or the user equipment 100 itself. Herein, the typo data includes the normal typing data and the data relating to the erroneously input key. Then, the normal typing data and the data relating to the erroneously input key can be stored in the form of two-dimensional or three-dimensional coordinate value according to the type of the virtual keyboard.

The output interface can be configured to include a display and a speaker.

The communication unit 104 can be configured to include at least one of a mobile communication module and a wireless internet module. In addition, the communication unit 104 can further include a short-range communication module.

The mobile communication module can transmit and receive a wireless signal with at least one of a base station, an external terminal, and a server on a mobile communication network according to the technology standards or the communication method for mobile communication (e.g., Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), 5G mobile communication, etc.).

The wireless internet module refers to a module for wireless internet access, and can be embedded in the user equipment 100 or externally. The wireless internet module is configured to transmit and receive a wireless signal on the communication network according to the wireless internet technologies.

The wireless internet technologies are, for example, Wireless LAN (WLAN), Wireless-Fidelity (Wi-Fi), Wireless Fidelity (Wi-Fi) Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), Long Term Evolution-Advanced (LTE-A), etc.

The short-range communication module is for short-range communication, and can support the short-range communication by using at least one of Bluetooth (Bluetooth™) Radio Frequency Identification (RFID), Infrared Data Association (IrDA), Ultra Wideband (UWB), ZigBee, Near Field Communication (NFC), Wireless-Fidelity (WiFi), Wi-Fi Direct, and Wireless Universal Serial Bus (Wireless USB) technologies.

The touch screen panel (TSP) 105 is one of the input devices for recognizing its position to transfer it to a system, when the user presses or contacts on the display screen with a finger or a pen, etc.

The TSP 105 includes a touch panel, and the touch panel is composed of an upper plate and a bottom plate (Film or Glass) on which a transparent electrode (Indium Tin Oxide, ITO) has been deposited, and serves to detect a signal generating position in which contact occurs or electrical capacity changes to transmit it to the processor 121.

The processor 121 converts the analog signal transmitted from the touch panel into a digital signal and converts it into a coordinate form that can be displayed on the screen.

The processor 121 receives the input digital signal to control the touch panel according to each operating system by using the driver program 113.

The TSP 105 is classified into Resistive, Surface Acoustic Wave, Infrared, and Optical Imaging touch screens according to the application technique.

The Resistive type is formed of a structure of bonding two substrates coated with the transparent electrode (ITO metal Layer) layer with a Dot Spacer interposed therebetween so that the transparent electrode layers face each other, and has a principle in that a signal for position detection is applied when a finger or a pen has contacted the upper substrate because the transparent electrode has been coated inside of a special film, and an electrical signal is detected to determine a position when having contacted the transparent electrode layer of the lower substrate. The Resistive type is classified into 4, 5, and 8-lines resistive method according to how many conductive lines the X, Y coordinates are detected with, and is one of the most widely used methods along with a Capacitive method.

Although the Resistive method has the advantages in that a manufacturing cost is low, a high resolution is possible, and various devices are used as an input tool, it has the disadvantages in that there is a difficulty in enlarging, and durability is low. The Resistive method is mainly used in a mobile phone, a game machine, a navigation device, etc.

The Capacitive method is currently used in most smart phones.

A transparent electrode is formed by coating a special conductive metal on both surfaces of a substrate constituting a touch screen sensor. When a certain amount of current flows on the glass surface, the change in the amount of current is recognized by the capacitance in the human body due to the potential difference between the two conductors when the user touches, and the touched position is detected by the calculated size thereof.

The Capacitive method can use a finger, a dedicated pen, etc. as an input means, and is applied to a smart phone, a tablet PC, etc. because the multi-touch is possible and the high resolution is possible, and on the other hand, has the disadvantages in that it is expensive, and there is a difficulty in enlarging.

The TSP 105 can be classified into an external type (Add on Type) and a built-in type (On Cell/In Cell) according to the structure of the panel on which the touch screen is disposed, and classified into Capacitive type, Resistive type, Infrared, Acoustic Wave, and Pressure methods according to the operating principle.

In the case of the external type, the touch screen panel is attached to the outside of the display panel in the form of a film, and in the case of the built-in type On Cell, the touch sensor is embedded on the glass substrate of the upper portion of the cell, and in the case of the built-in In Cell, the touch sensor is embedded inside the cell.

FIG. 4 is a flowchart of a virtual keyboard control method according to an embodiment of the present disclosure.

Referring to FIG. 4, the virtual keyboard control apparatus 101 collects the typo data including the desired input key and the erroneously input key S110.

The typo data includes coordinate values relating to the position actually input with respect to the normally input key after correction by using the normally input key and the erroneously input key for each key input from the virtual keyboard, and a backspace key. Herein, the coordinate value means a two-dimensional coordinate value distributed in a range of (1, 1) to (−1, −1) for each key. When the virtual keyboard is displayed in the three dimensions, the coordinate value can be displayed as a three-dimensional coordinate value.

The coordinate value corresponds to a coordinate value of a point in a sensing region where the contact with a finger actually occurs, when the virtual key, for example, the virtual key displayed on the touch screen panel 105 is touched. Therefore, when (0, 0) is the coordinate value of the corresponding key, it corresponds to the case where the user has touched the center of the virtual key. Since the coordinate value of the erroneously input key, that is, the coordinate value according to the occurrence of the typo, has been input instead of the desired input key, the coordinate value deviates from (0, 0) in many cases.

Next, the virtual keyboard control apparatus 101 analyzes the collected typo data S120. Herein, the S120 can include calculating a typo rate.

The typo rate can be calculated for each key. The typo rate means the number of the cases of the erroneously input key for each key as compared to all inputs. The typo rate can be changed after a key mapping has been updated.

Next, the virtual keyboard control apparatus 101 updates the key mapping of at least one virtual key of the desired input key and the erroneously input key by using the analyzed result S130.

The key mapping refers to the relationship between the virtual key and the sensing region assigned thereto. When the user equipment 100 is shipped from the factory, the sensing region of each key can be set to a default value proportional to the area of the virtual key. However, the typo rate can highly occur in a specific virtual key region according to the size of the virtual keyboard, the position of the virtual key, the input habit of the user, the size of the user's finger, etc. In this case, the sensing region of the virtual keyboard can be changed from a default value to a direction in which the typo rate reduces. This change is called a key mapping update. The key mapping update can be performed on the erroneously input key, the key causing the error, or both of them.

The key mapping update of the virtual key according to an embodiment of the present disclosure is distinguished from changing the position, shape, and area of the virtual key itself according to the related art. The changing the position, shape, and area of the virtual key itself targets the key displayed on the display screen. However, the key mapping update of the virtual key according to an embodiment of the present disclosure refers to at least one update among the position, shape, and area of the sensing region thereof with respect to the sensing region allocated to the virtual key.

In the present disclosure, the key mapping update does not perform once, but can additionally collect the typo data generated according to the updated key mapping, and repeatedly perform S120 to S130 until a reduction in the typo rate converges to zero. That is, the virtual keyboard control apparatus 101 can collect new typo data generated according to the updated key mapping S140.

Then, the virtual keyboard control apparatus 101 can calculate the typo rate based on the new typo data S150.

Next, the virtual keyboard control apparatus 101 determines whether the typo rate based on the new typo data has reduced S160. If the typo rate has reduced as compared to the previous one, the new typo data can be analyzed again S120. As described above, the typo rate can gradually reduce by the key mapping update, and the virtual keyboard control method according to an embodiment of the present disclosure is terminated when the typo rate converges to zero.

If the typo rate increases, this is regarded as the trial and error to terminate all subsequent steps, and after the restart, the key mapping is updated in a method different from before and the subsequent steps are performed.

In the present disclosure, it is determined whether the typo rate has been reduced after the key mapping update S160, and when it is determined that the typo rate has reduced, the information on the key mapping update is fed back to the analyzing the typo data, that is, S120.

FIG. 5 is an exemplary diagram of the key mapping update according to an embodiment of the present disclosure.

Referring to FIG. 5, the virtual keyboard is shown at the upper end thereof. Each key of the virtual keyboard has a sensing region, which is indicated by the dotted line coinciding with the region displayed on the display screen, as a default value. As a result of analyzing the typo data of certain user, it has been analyzed that the user has the habit of not touching the center of a 'q' key but touching the region rightwards from the center of the 'q' key at the degree of interfering a 'w' key. In this case, it is necessary to reduce the sensing region of the 'w' key so that the sensing region where the finger is sensed and the sensing region of the 'w' key do not overlap with each other. Herein, in addition, it is also possible to further widen the sensing region of the 'q' key. That is, the key mapping of the 'q' key and the 'w' key is updated by changing the sensing region. The 'q' key and the 'w' key are shown in the two-dimensional XY plane, and the key mapping update is shown in the XYZ section of the virtual keyboard. Herein, the important point is that it is unnecessary to change the area of the virtual key displayed on the display screen. According to the related art, a change in the arrangement, shape, and position of the key in the virtual keyboard occurs with respect to the display screen. In this case, there is a high probability that the secondary typo will occur due to the changed key on the display screen.

The generation of the typo due to interference originates from the spatial narrowness of the virtual key region and the unconscious habit of the user in many cases. Therefore, a solution for preventing the generation of the typo also needs to be applied in a state where the user is unconscious. When the shape or position of the virtual key itself is changed in order to solve the spatial narrowness, a new type of typo can be caused because it affects the surrounding virtual key. Such a typo can be solved by the key mapping update that updates only the sensing region.

FIG. 6 is a typo distribution diagram showing the typo rate according to an embodiment of the present disclosure.

Referring to FIG. 6, a normal group indicating the normal inputs and a typo group indicating the erroneous inputs are shown on the key pad shown at the left thereof. The normal group of the solid line is distributed in the central region of a 't' key and the central region of a 'f' key, respectively, and the typo group of the dotted line is distributed in the region between the 't' key and the 'f' key.

The typo rate for region of one key is shown in the typo distribution diagram shown in the right of FIG. 6. Explaining the 't' key as an example, when the center of the 't' key is indicated as (0, 0) and the four edges of the 't' key are indicated as (−1, −1), (−1, 1), (1, −1), and (1, 1), it is shown that the typo rate is the lowest in the (0, 0) region, and the typo rate is the highest at the four edges. Herein, the distribution of the typo can be changed according to the position where the typo group occurs, and the existing key mapping can be updated according to the typo rate on the typo distribution diagram.

The analyzing the typo data S120 in an embodiment according to the present disclosure can be configured to include learning an Artificial Intelligence model by using an Artificial Intelligence algorithm S122.

In addition, in an embodiment according to the present disclosure, the updating the key mapping S130 can be configured to include updating the key mapping by using the Artificial Intelligence model learned based on the Artificial Intelligence algorithm S132.

FIG. 7 is an exemplary diagram of a Deep Learning process according to an embodiment of the present disclosure.

Referring to FIG. 7, an embodiment using the Artificial Intelligence algorithm, particularly, Deep Learning, is shown. Hereinafter, the Artificial Intelligence algorithm will be described.

Artificial intelligence (AI) is a field of computer engineering and information technology that researches a method for the computer to enable thinking, learning, self-development, etc. which are possible by human's intelligence, and means that the computer can imitate human's intelligent behavior.

In addition, the Artificial Intelligence does not exist in itself, but has many direct and indirect links with other fields of computer science. Particularly, in modern times, the Artificial Intelligence element has been introduced in various fields of information technology, and it is very actively attempted to use it as the solution to the problem in the field thereof.

Machine Learning is a field of Artificial Intelligence, and a field of research that gives the ability capable of learning without an explicit program in the computer.

Specifically, the Machine Learning can be a technology for researching and constructing a system for learning, predicting, and improving its own performance based on empirical data and an algorithm for the same. The algorithms of the Machine Learning take a method of constructing a specific model in order to obtain the prediction or the determination based on the input data, rather than performing the strictly defined static program instructions.

Many Machine Learning algorithms have been developed on how to classify data in the Machine Learning. Decision Tree, Bayesian network, Support Vector Machine (SVM), Artificial Neural Network (ANN), etc. are representative examples.

The Decision Tree is an analytical method that performs classification and prediction by plotting a Decision Rule in a tree structure.

The Bayesian network is a model of the probabilistic relationship (conditional independence) between multiple variables in a graphical structure. The Bayesian network is suitable for data mining through Unsupervised Learning.

The Support Vector Machine is a model of Supervised Learning for pattern recognition and data analysis, and mainly used for classification and regression.

The Artificial Neural Network is to model the connection relationship between the operating principle of biological neuron and neuron, and an information processing system in which a number of neurons called a node or a processing element have been connected in the form of a layer structure.

The Artificial Neural Network is a model used in the Machine Learning, and a statistical learning algorithm inspired by brain, which is one of the central nervous system of animal.

Specifically, the Artificial Neural Network can mean the whole model in which the artificial neuron (node) forming a network by the synapse combination changes the synaptic bond strength through learning to have the problem-solving ability.

The term 'Artificial Neural Network' can be used interchangeably with the term 'Neural Network.'

The Artificial Neural Network can include a plurality of layers, and the respective layers can include a plurality of neurons. In addition, the Artificial Neural Network can include the synapse for connecting between neuron and neuron.

The Artificial Neural Network can be generally defined by three factors, that is, (1) a connection pattern between neurons of different layers, (2) a learning process updating the weight of connection, (3) an activation function generating an output value from the weighted sum of the input received from a previous layer.

The Artificial Neural Network can include network models of the method such as Deep Neural Network (DNN), Recurrent Neural Network (RNN), Bidirectional Recurrent Deep Neural Network (BRDNN), Multilayer Perceptron (MLP), and Convolutional Neural Network (CNN), but is not limited thereto.

In the present specification, the term 'layer' can be used interchangeably with the term 'class.'

The Artificial Neural Network is classified into a Single-Layer Neural Network and Multi-Layer Neural Network according to the number of layers.

A general Single-Layer Neural Network is composed of an input layer and an output layer.

In addition, a general Multi-Layer Neural Network is composed of an Input layer, one or more Hidden layers, and an Output layer.

The Input layer is a layer that accepts external data, the number of neurons in the Input layer is equal to the number of input variables, and the Hidden layer is disposed between the Input layer and the Output layer and receives a signal from the Input layer to extract the characteristics to transfer it to the Output layer. The Output layer receives a signal from the Hidden layer, and outputs an output value based on the received signal. The Input signal between neurons is multiplied by each connection strength (weight) and then summed, and if the sum is larger than the threshold of the neuron, the neuron is activated to output the output value obtained through the activation function.

Meanwhile, the Deep Neural Network including a plurality of Hidden layers between the Input layer and the Output layer can be a representative Artificial Neural Network that implements Deep Learning, which is a type of Machine Learning technology.

Meanwhile, the term 'Deep Learning' can be used interchangeably with the term 'In-depth Learning.'

The Artificial Neural Network can be trained by using training data. Herein, the training can mean a process of determining a parameter of the Artificial Neural Network by using training data in order to achieve the objects such as classification, regression, clustering, etc. of input data. As a representative example of the parameter of the Artificial Neural Network, there can be a weight given to a synapse or a bias applied to a neuron.

The Artificial Neural Network trained by the training data can classify or cluster the input data according to the pattern of the input data.

Meanwhile, the Artificial Neural Network trained by using the training data can be referred to as a trained model in the present specification.

Next, the learning method of the Artificial Neural Network will be described.

The learning method of the Artificial Neural Network can be largely classified into Supervised Learning, Unsupervised Learning, Semi-supervised Learning, and Reinforcement Learning.

The Supervised Learning is a method of the Machine Learning for inferring one function from the training data.

Then, among the thus inferred functions, outputting consecutive values is referred to as regression, and predicting and outputting a class of an input vector is referred to as classification.

In the Supervised Learning, the Artificial Neural Network is learned in a state where a label for the training data has been given.

Herein, the label can mean a correct answer or a result value to which the Artificial Neural Network should infer when the training data is input to the Artificial Neural Network.

In the present specification, the correct answer or the result value to which the Artificial Neural Network should infer when the training data is input is referred to as label or labeling data.

In addition, in the present specification, setting the label to the training data for training of the Artificial Neural Network is referred to as labeling the labeling data on the training data.

In this case, the training data and the label corresponding to the training data can constitute one training set, and can be input to the Artificial Neural Network in the form of the training set.

Meanwhile, the training data represents a plurality of features, and the labeling the label on the training data can mean that the feature represented by the training data is labeled. In this case, the training data can represent the feature of the input object in the form of a vector.

The Artificial Neural Network can infer a function of the relationship between the training data and the labeling data by using the training data and the labeling data. Then, the parameter of the Artificial Neural Network can be determined (optimized) by evaluating the function inferred from the Artificial Neural Network.

The analyzing the typo data S120 in the virtual keyboard control method S100 according to an embodiment of the present disclosure is implemented through the learning the Artificial Intelligence model S122, and the updating the key mapping according to the analyzed result S130 can be implemented through obtaining an output by using the learned model S132.

In the Supervised Learning process of the Deep Learning, the typo distribution diagram including the typo data shown in FIG. 6 and the key mapping update information corresponding thereto can be used as the labeling data. On the other hand, the Unsupervised Learning is a kind of Machine Learning, and no labeling of training data is given.

The Reinforcement Learning is a theory that if an agent can determine what action should be done every moment, then it is possible to find the best path with experience without data.

The Reinforcement Learning can be mainly performed by a Markov Decision Process (MDP).

Explaining the Markov Decision Process, firstly, the environment in which the agent has the necessary information to do the following actions is given, secondly, it is defined how the agent behaves in the environment, thirdly, it is defined how to give reward or penalty to the agent, and fourthly, the best policy is obtained by repeatedly experiencing until the future reward reaches its peak.

FIG. 8 is an exemplary diagram of Reinforcement Learning according to an embodiment of the present disclosure.

Referring to FIG. 8, the virtual keyboard control method according to an embodiment of the present disclosure can be implemented by using the Reinforcement Learning of the Deep Learning among the Artificial Intelligence algorithms.

In the Reinforcement Learning model according to an embodiment of the present disclosure, the reduction in the typo rate serves as reward. According to the Reinforcement Learning, the typo rate continues to reduce, and the Reinforcement Learning is performed until the reduction in the typo rate converges to zero. The Artificial Intelligence model including the DNN neural network continues to perform the key mapping according to the reward in the environment where the typo occurs.

Meanwhile, the trained model can be mounted as a part of the Deep Learning program 112 in the memory 110 of the virtual keyboard control apparatus 101. The trained model can be implemented in hardware, software, or a combination of hardware and software, and one or more instructions that constitute the trained model can be stored in the memory 110 when some or all of the trained models are implemented in software.

The above-described virtual keyboard control method according to an embodiment of the present disclosure can be implemented as a computer-readable code on a medium on which a program is recorded. The computer readable medium includes all kinds of recording devices in which data readable by a computer system are stored. Examples of the computer readable medium include a Hard Disk Drive (HDD), a Solid State Disk (SSD), a Silicon Disk Drive (SDD), a ROM, a RAM, a CD-ROM, a magnetic tape, a floppy disk, an optical data storage device, etc. In addition, the computer can also include the processor 121 of the user equipment 100.

It will of course be realized that while the foregoing has been given by way of illustrative example of this disclosure, all such and other modifications and variations thereto as would be apparent to those skilled in the art are deemed to fall within the broad scope and ambit of this disclosure as is herein set forth.

What is claimed is:

1. A control method performed by a virtual keyboard control apparatus, comprising:
collecting typo data based at least in part on inspecting a history of a modified key input with respect to an erroneously input key, wherein the typo data comprises a desired input key and an erroneously input key;
analyzing the collected typo data based at least in part by calculating a typo rate, wherein the typo rate corresponds to a number of cases of the erroneously input key for each key as compared to all inputs; and
updating, based on the analyzed collected typo data, a key mapping of at least one virtual key of the desired input key and the erroneously input key, wherein the updating includes changing at least one of a position, a shape, or an area of a sensing region allocated to the at least one virtual key without changing the position, the shape, and a width of the at least one virtual key itself that is displayed, wherein the sensing region corresponds to a region where a user contact is sensed on the virtual keyboard control apparatus.

2. The control method of claim 1, further comprising:
collecting new typo data according to the updated key mapping;
analyzing the collected new typo data based at least in part by calculating the typo rate,
re-updating the updated key mapping of the at least one virtual key of the desired input key and the erroneously input key based at least in part on updating at least one of a position, a shape, or an area of a sensing region allocated to the at least one virtual key itself and by using the analyzed collected new typo without changing the position, the shape, and the width of the displayed at least one virtual key.

3. The control method of claim 2, further comprising determining whether the typo rate has been reduced after the key mapping update,
wherein when the typo rate has been reduced, feed backing information on the key mapping update to the analyzed typo data based on a determination that the analyzed collected new typo rate has been reduced with respect to the analyzed collected typo rate after the key mapping update.

4. The control method of claim 1,
wherein the typo is generated by the user contact on the virtual keyboard control apparatus or an interference between the virtual keys due to a user typing on the virtual keyboard control apparatus.

5. The control method of claim 1, wherein the typo data further comprises two-dimensional coordinate values corresponding to the desired input key and the erroneously input key.

6. The control method of claim 1, wherein the typo data is analyzed based at least in part by an Artificial Intelligence model.

7. The control method of claim 1,
wherein the updating the key mapping comprises using a Reinforcement Learning based Deep Learning process of an Artificial Intelligence model that minimizes the typo rate as a reward for the Reinforcement Learning based Deep Learning process of the Artificial Intelligence model.

8. The control method of claim 1,
wherein the updating the key mapping is performed on the at least one virtual key with respect to the at least one virtual key having a threshold typo rate.

9. A virtual keyboard control apparatus, comprising:
an input interface for receiving typo data comprising information on a desired input key and an erroneously input key from a virtual keyboard;
a memory for storing key mapping information comprising a sensing region of the virtual keyboard control apparatus and a key value corresponding thereto, wherein the sensing region corresponds to a region where a user contact is sensed on the virtual keyboard control apparatus; and
a control unit for outputting the key value corresponding to the corresponding key by using the key mapping information according to a sensing of the user contact,
wherein the control unit comprises a processor, wherein the processor is configured to:
collect the typo data based at least in part on inspecting a history of a modified key input with respect to an erroneously input key, wherein the typo data comprises a desired input key and an erroneously input key;
analyze the collected typo data based at least in part by calculating a typo rate, wherein the typo rate corresponds to a number of cases of the erroneously input key for each key as compared to all inputs; and
update, based on the analyzed collected typo data key, a key mapping of at least one virtual key of the desired input key and the erroneously input key, wherein the updating includes changing at least one of a position, a shape, or an area of a sensing region allocated to the at least one virtual key without changing the position, the shape, and a width of the at least one virtual key itself that is displayed.

10. The virtual keyboard control apparatus of claim 9, wherein the processor is further configured to:
collect new typo data according to the updated key mapping;
analyzing the collected new typo data based at least in part by calculating the typo rate,
re-updating the updated key mapping of the at least one virtual key of the desired input key and the erroneously input key based at least in part on updating at least one of a position, a shape, or an area of a sensing region allocated to the at least one virtual key itself and by using the analyzed collected new typo without changing the position, the shape, and the width of the displayed at least one virtual key.

11. The virtual keyboard control apparatus of claim 10,
wherein the processor is further configured to determine whether the typo rate has been reduced after the key mapping update, and
wherein when the typo rate has been reduced, feed backing information on the key mapping update to the analyzed typo data based on a determination that the new analyzed collected typo rate has been reduced with respect to the analyzed collected typo rate.

12. The virtual keyboard control apparatus of claim 9,
wherein the typo is generated by the user contact on the virtual keyboard control apparatus or an interference between the virtual keys due to a user typing on the virtual keyboard control apparatus.

13. The virtual keyboard control apparatus of claim 9,
wherein the typo data comprises two-dimensional coordinate values corresponding to the desired input key and the erroneously input key.

14. The virtual keyboard control apparatus of claim 9,
wherein the typo data is analyzed based at least in part on by an Artificial Intelligence model.

15. The virtual keyboard control apparatus of claim 9,
wherein the processor is further configured to update the key mapping by using a Reinforcement Learning based Deep Learning process of an Artificial Intelligence model that minimizes the typo rate as a reward for the Reinforcement Learning based Deep Learning process of the Artificial Intelligence model.

16. The virtual keyboard control apparatus of claim 9,
wherein the updating the key mapping is performed on the at least one virtual key with respect to the at least one virtual key having a threshold typo rate.

* * * * *